US007869451B2

(12) United States Patent
Charles et al.

(10) Patent No.: US 7,869,451 B2
(45) Date of Patent: Jan. 11, 2011

(54) METHOD FOR OPERATING A LOCAL COMPUTER NETWORK CONNECTED TO A REMOTE PRIVATE NETWORK BY AN IPSEC TUNNEL, SOFTWARE MODULE AND IPSEC GATEWAY

(75) Inventors: Olivier Charles, Clamart (FR); Laurent Butti, Issy les Moulineaux (FR); Franck Veysset, Issy les Moulineaux (FR)

(73) Assignee: France Telecom, Paris (FR)

( * ) Notice: Subject to any disclaimer, the term of this patent is extended or adjusted under 35 U.S.C. 154(b) by 1026 days.

(21) Appl. No.: 11/300,107

(22) Filed: Dec. 14, 2005

(65) Prior Publication Data
US 2006/0171401 A1 Aug. 3, 2006

(30) Foreign Application Priority Data
Dec. 16, 2004 (FR) .................................. 04 13413

(51) Int. Cl.
*H04L 12/28* (2006.01)
*H04L 29/06* (2006.01)
(52) U.S. Cl. ...................... 370/409; 370/392; 370/397; 370/399; 370/401; 713/152; 713/153
(58) Field of Classification Search ................. 370/401, 370/397, 399, 409, 389, 392; 713/151–153
See application file for complete search history.

(56) References Cited

U.S. PATENT DOCUMENTS

| | | | | |
|---|---|---|---|---|
| 6,055,236 A * | 4/2000 | Nessett et al. ............... 370/389 |
| 6,243,379 B1 * | 6/2001 | Veerina et al. .............. 370/389 |
| 6,431,772 B1 * | 8/2002 | Melo et al. .................... 400/70 |
| 6,671,729 B1 * | 12/2003 | Gordon et al. .............. 709/227 |
| 7,296,155 B1 * | 11/2007 | Trostle et al. ............... 713/170 |
| 2002/0010866 A1 * | 1/2002 | McCullough et al. ....... 713/201 |
| 2002/0136210 A1 * | 9/2002 | Boden et al. ................. 370/389 |
| 2003/0182363 A1 | 9/2003 | Clough et al. ............... 709/241 |
| 2004/0071149 A1 * | 4/2004 | Kim et al. .................... 370/401 |
| 2004/0078600 A1 * | 4/2004 | Nilsen et al. ................. 713/201 |
| 2004/0177157 A1 | 9/2004 | Mistry et al. ................ 709/203 |
| 2004/0227971 A1 * | 11/2004 | Clough et al. .............. 358/1.14 |
| 2005/0213574 A1 * | 9/2005 | Yoshimura et al. .......... 370/389 |

OTHER PUBLICATIONS

P. Srisuresh, RFC 2709, Security Model with Tunnel-mode IPsec for NAT Domains Status of this Memo, Oct. 1999.*
Easy Software Products; An Overview of the Common UNIX Printing System, Version 1.1; Jul. 10, 2000.

* cited by examiner

*Primary Examiner*—Daniel J Ryman
*Assistant Examiner*—Thinh D Tran
(74) *Attorney, Agent, or Firm*—Harness, Dickey & Pierce, PLC

(57) ABSTRACT

The invention relates to a method in particular enabling the computer terminal (T_L) of a local network (RES_L), connected to a gateway (PASS_D) of a remote network (RES_D) by an IPsec tunnel in blocking mode, to launch a print job on a printer (E_L) belonging to the local network. To do this, the gateway (PASS_D) stores the correspondence between the public address (AD_1) of the local router (ROUT_L) providing the connection of the terminal to the Internet, and the private address (ad_3) assigned to the terminal (T_L) in the addressing plan of the remote network (RES_D) during the establishment of the tunnel, and sends the print flow to the local router (ROUT_L), which directs it to the local printer (E_L) by a port translation technique.

16 Claims, 1 Drawing Sheet

METHOD FOR OPERATING A LOCAL COMPUTER NETWORK CONNECTED TO A REMOTE PRIVATE NETWORK BY AN IPSEC TUNNEL, SOFTWARE MODULE AND IPSEC GATEWAY

FIELD

The invention relates, in general, to the operation of mutually connected networks, in particular computer networks.

More specifically, the invention, according to a first characteristic, relates to a method for operating a local network comprising a local terminal connected to a gateway of a remote network by a blocking tunnel, which method includes an operation in which the flows from the terminal are directed to the gateway through the blocking tunnel.

BACKGROUND

As is known to a person skilled in the art, a connection between two networks can be an IP connection and can be constituted by the Internet or by any other network using Internet protocols.

In addition, as is also known to a person skilled in the art, the Internet uses a security protocol known as "IPsec," which is an acronym for "Internet Protocol Security."

SUMMARY

This invention, in its primary effective application, relates to computers in a nomadic situation when they are connected to a private business network by the IPsec protocol. It is especially applicable when the nomad user telecommutes, i.e. when he or she is connected from the home network (the local network of his or her home) to the remote private network of the business. The method is nevertheless applicable to other types of local networks, such as wireless connection zones referred to as "wi-fi hotspots", for example.

By convention, this description uses the terms "terminal" or "local terminal" to refer to the computer from which the nomad user connects to the local network, then to the remote private network of the business.

The term "local equipment" refers to any computer equipment connected to the local network and which must be provided with access to the terminal during its IPsec connections. This local equipment, can thus consist, in a statistically representative manner, of a printer, but can also consist of any other type of server of the local network (ftp, telnet, etc.) to which the terminal must have access during its IPsec connections.

The terms "router," "local router" and "home router" refer to equipment located at the input of the local network (or home network when discussing a nomad user, such as a telecommuter), the functions of which will be described in greater detail below.

The term "gateway," and in particular "Ipsec gateway," refers to equipment located between the terminal and the remote private network of the business, which is in particular responsible for terminating the tunnels, in particular IPsec tunnels, coming from the terminals, of which the functions will be described in greater detail below. It can be located at the edge of the remote network and managed by the business or by a telecommunications network operator.

For reasons of security, most implementations of the IPsec protocol do not enable the local terminal to simultaneously access the local network and the remote network of the business. Without this prohibition, the terminal would be in a "double connection" situation and would interconnect the two networks, constituting a serious security flaw.

This prohibition is ensured by a specific mode called "blocking mode" and provided in particular in the IPsec protocol.

The blocking mode is therefore a technique that enables the double connection of a local terminal to the remote network accessible with IPsec (typically the private network of the business) and the local network (typically the home network). To do this, the blocking mode prevents any communication of the local terminal outside of the IPsec tunnel, which significantly limits the risks of bounce attacks in the IPsec tunnel (and therefore to the information system of the business).

As the blocking mode is most advantageous for businesses concerned with security, the security policies of businesses that can be accessed remotely with IPsec generally activate it by default.

In practice, the blocking mode is implemented in the IPsec software of the terminal, and generally modifies the client routing configuration so as to send all packets to a default route that belongs to the addressing plan of the remote network of the business. It also uses an access filtering function (typically a personal firewall) preventing any communication from the outside to the terminal.

The counterpart of this security operation is that the nomad terminal, during a connection to its distant network (also called "intranet"), can no longer access the machines (equipment) present on the local network to which it is physically connected. In particular, it no longer has access to the printer of its local network since all of the control and data flows are automatically channeled by the blocking tunnel to the remote network of the business.

The only way, known at present, to overcome this problem consists of using the so-called "split-tunneling" technique, which provides the possibility for the local terminal to directly communicate with any local network equipment in spite of the concomitant existence of the IPsec tunnel, and therefore to access the local services.

The problem is that this technique carries a significant risk of hacking penetration over the remote network of the business by bounce attacks on the terminal. Thus, the use of this technique is strongly discouraged, and even forbidden, by most business network administrators.

In this context, the objective of the present invention is, in particular, to propose a method enabling the local terminal to address a local apparatus in spite of the concomitant existence of a connection of this terminal to an IPsec gateway through a blocking tunnel, wherein this functionality is obtained without adversely affecting the security provided by the blocking tunnel and without any modification of the local terminal or the local equipment concerned, in particular the printer.

To this end, the method of the invention, which corresponds to the general definition provided in the preamble above, is essentially characterized in that it also includes an operation of sending a flow not intended for said remote network implemented in the gateway and consisting of sending said flow from the terminal intended for an apparatus of the local network to said local equipment.

The sending operation can, for example, involve the reception of said flow by a router of the local network, and the directing by said router of said flow to said equipment.

The sending operation can also include the analysis by the gateway of the flows so as to recognize a flow not intended for said remote network.

The invention, in a very specific and detailed definition, can also consist of a method for operating a local computer network in a configuration including, in addition to said local network, a remote private computer network to which the local network is connected via an IP-type connection network, a local router located at the interface between the local network and the connection network, and an IPsec gateway located at the interface between the remote network and the connection network, wherein the local network includes at least one local terminal and a local computer apparatus, and the terminal is connected to the IPsec gateway by an IPsec tunnel in blocking mode, which method allows for automatic rerouting, to the gateway and through the tunnel in blocking mode, of a control and/or data flow from the terminal intended for the local equipment, and therefore including:

an analysis operation, implemented in the gateway upon its reception of the control and/or data flow from the terminal intended for the local equipment and consisting of recognizing that this flow is not intended for the remote network, a sending operation implemented in the gateway and consisting of sending to the local router the control and/or data flow from the terminal, and a directing operation, implemented in the local router and consisting of directing to said local equipment the control and/or data flow from the local terminal and sent by the gateway to the local router.

If the local router, to which a routable address is assigned, substitutes its own routable address for the terminal inside the local network during the request for connection to the remote private network coming from the terminal intended for the gateway, and the IPsec gateway assigns the local terminal an address inside the remote network during the establishment of the blocking tunnel, the method can also include a correlation operation implemented in the gateway during the establishment of the blocking tunnel and consisting of storing a correspondence table putting the routable address of the local router and the address of the terminal inside the remote network in mutual correspondence, in which the operation of sending the control and/or data flow uses the correspondence table, and consisting of sending to the routable address of the local router the control and/or data flow coming from the terminal identified by the address inside the remote network.

The directing operation is preferably implemented by a port translation technique.

The control and/or data flow can, for example, include a print command.

The method can include an additional operation, implemented by the gateway, and consisting of establishing a second IPsec or SSL-type tunnel connecting said gateway to the local router.

As an alternative, the operation implemented by the gateway can consist of establishing a second IPsec or SSL-type tunnel connecting said gateway to the local equipment, in this case constituted by a printer.

In addition, the method of the invention can include an operation implemented by the local router and consisting of reserving for the gateway the access to the local equipment, in this case constituted by a printer.

The invention also relates to a software module including instructions that, once this module is loaded on an IPsec gateway, implement at least the correlation operation of the method as defined above, which instruction can also implement the analysis operation and the sending operation of this method.

The invention also relates to an IPsec gateway, which is at least partially controlled by a software module as defined above.

Other features and advantages of the invention will become clear from the following description, provided as an indication that is in no way limiting, in reference to the single FIGURE, which diagrammatically shows the architecture and the means implemented in the invention.

DESCRIPTION OF THE INVENTION

Figure 1:
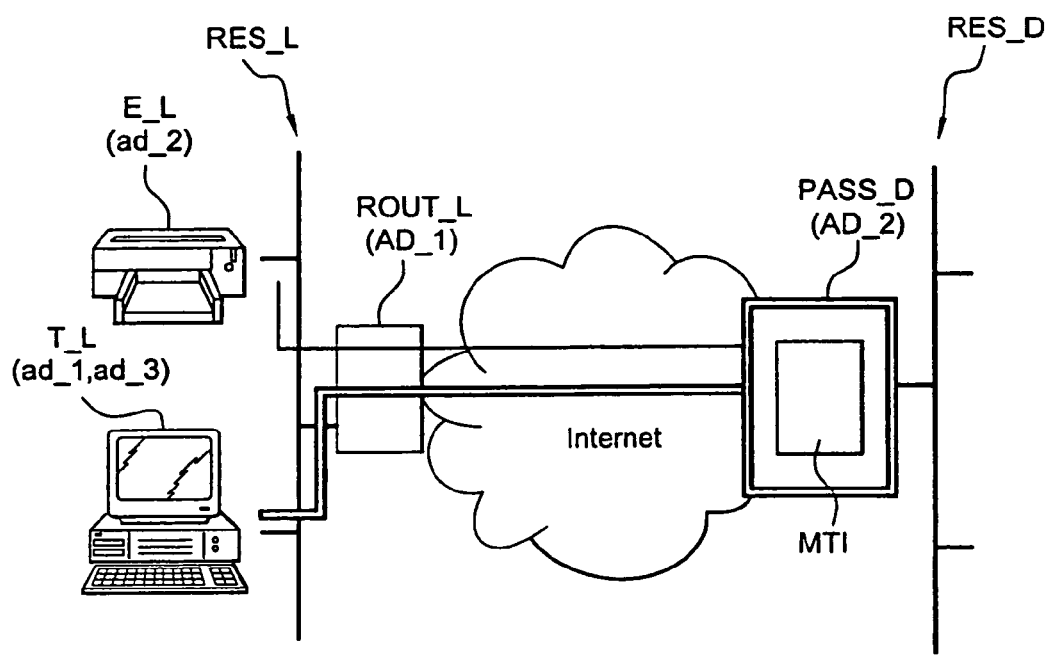
FIG. 1 is a schematic view demonstrating a local computer network linked to a remote computer network.

As indicated above, the invention relates in particular to a method for operating a local computer network RES_L, for example a home network, in the configuration shown in the FIGURE and including, in addition to this local network RES_L, a remote private computer network RES_D, for example a business "intranet" network, a local router ROUT_L, and an IPsec gateway PASS_D, wherein the local network RES_L itself includes at least one local terminal T_L and a local computer apparatus E_L such as a printer or a server suitable for any type of home service over IP to which the terminal T_L must be capable of continuously accessing, for example ftp, telnet, and so on.

The T_L terminal is configured with a list of peripherals E_L, such as printers on which it can perform print jobs, and in particular the printer of the local network. It also implements the IPsec protocol in order to connect to the IPsec gateway PASS_D.

The IPsec software is assumed to function only in blocking mode, and therefore not to authorize split tunneling.

The local router ROUT_L, which is located at the input of the local network RES_L, performs a plurality of functions, namely:

establishing the physical connection (ISDN, cable, xDSL, etc.) of the terminal T_L to the Internet;

accepting the communications of the various equipment E_L of the local network RES_L (PC, printer, scanner, decoders, etc.); these connections are generally via cable Ethernet or are wireless ([IEEE802.11]);

translating the internal addresses ([RFC1918]) of the terminal T_L and equipment E_L into a routable address; if, for example, the terminal T_L and a printer E_L have, in the local network RES_L, the respective internal addresses ad__1 and ad__2, the router ROUT_T translates, during an Internet connection, these internal addresses into the routable address AD__1, which is the one that this router obtained during its connection to the Internet access provider's network. This translation method is known to a person skilled in the art as NAT/NAPT (Network Address Translation, Network Address Port Translation), [RFC3022]. It consists of maintaining a correspondence table between the pairs: internal IP address, internal port number, and the pairs: external IP address, external port number. For each information packet addressed to the router ROUT_L or transmitted by it, the translation is performed according to this table; and implementing a port translation technique (known to a person skilled in the art as "port forwarding"), which consists of statically defining an association between an external port of the router and an internal port of said router, and which enables the machines outside the local network RES_L to access servers inside this local network by querying them about the known port numbers of the router.

The IPsec gateway PASS_D, which is located between the terminal T_L and the network RES_D of the business, is responsible for terminating the IPsec tunnels from the terminals. It has packet routing functions and is therefore open on the Internet by an interface and on the private network RES_D by another interface.

The gateway PASS_D, to which, for example, a routable address AD_2 is assigned, assigns the terminal T_L an address ad_3 inside the remote network RES_D during the establishment of the IPsec blocking tunnel between said terminal and said gateway.

In addition to standard IPsec gateways, the gateway of the invention comprises a software module MTI which offers the terminal T_L access to the equipment E_L or to the local equipment of the network RES_L, in a way that is specific to the invention, which will be described below in greater detail.

The implementation of the method of the invention is based on the following hypotheses.

The local network RES_L uses a so-called "private" addressing plan, i.e. complying with the standard RFC1918. This in fact corresponds to the default choice of the constructors of home routers ROUT_L; this network implements a DHCP server which assigns IP addresses on a "private" address range.

The remote network RES_D, for example the business network, does not use the same subnetwork addressing as is used in the home network RES_L. At a minimum, even if such an overlap exists, the ambiguity regarding the solicited network is removed by taking into account the origin of the request.

For example, if the network 10.0.0.X is used both in the business and in the home network:

if it is a machine of the business network RES_D that sends a packet to the address 10.0.0.3, then the receiving equipment is a machine of the business network RES_D, and if it is a machine of the local network RES_L that sends a packet to the address 10.0.0.3, then the receiving equipment is a machine of the local network RES_L.

The IPsec gateway PASS_D can make this distinction insofar as it knows the two addressing plans and is split between the two networks.

The method of the invention is based on the following principles:

The IPsec gateway PASS_D is the default router of all of the terminals T_L of the home networks such as RES_L. Thus, when a terminal T_L is, for example, going to order a print job on its local printer E_L, the print order will be systematically sent to the IPsec gateway PASS_D, since a connection cannot be made with the printer E_L due to the tunnel established in blocking mode between the terminal T_L and the gateway PASS_D. This is the normal behavior of an IP stack because the IPsec blocking mode modifies the client's routing table by forcing all of the packets to go to the business network RES_D.

When the IPsec gateway PASS_D sees the arrival of the IP packets addressed by the terminal T_L to the local equipment E_L identified by its internal address ad_2, it notes that it cannot route them to the business network RES_D. Indeed, in consideration of the hypotheses above, the solicited destination address_2 does not belong to the network RES_D of the business, or at the very least, a home terminal T_L has no reason to solicit such an address. The gateway PASS_D then deduces that it must send the packets to the home network RES_L.

To be capable of rerouting this traffic, the gateway PASS_D, however, needs to know to which home router ROUT_L is must be sent.

According to the invention, this information is constructed by the software module MTI, at the time of construction of the IPsec tunnel previously established between the terminal T_L and the IPsec gateway PASS_D.

Indeed, during the establishment of this IPsec tunnel, and because of the NAT mechanism implemented in the home router ROUT_L, it is the public address AD_1 of this router that has been used in the establishment of the IPsec tunnel.

After this, the IPsec gateway PASS_D assigns the terminal T_L an internal address ad_3 of the business addressing plan. The IPsec gateway PASS_D therefore knows the link between the address ad_3 of the terminal T_L on the internal addressing plan of the business and the public address AD_1 of the home router ROUT_L, and the function of the software module MTI is in particular to keep track of this correspondence.

Consequently, when the IPsec gateway PASS_D receives IP packets from the nomad terminal T_L and must send these packets to the home network RES_L, it knows precisely the public address AD_1 of the home router ROUT_L.

The home router ROUT_L normally implements a port translation mechanism (or "port forwarding"), so that it is capable, when it receives connections from the Internet to a particular port, of translating the address to a local internal apparatus E_L on a particular port number. For example, in this case, all of the packets received from the Internet and on the printing port corresponding to the address ad_2 can be retransmitted directly to the port of the internal printer E_L.

This technique can be used with all existing print protocols, in particular the IPP described below.

New standards have been defined in the context of IETF work, in this case in the PWG Working group [IETF-IPP], where the IPP (Internet Printing Protocol, [RFC 2910], [RFC 2911]) specifies extensions to the protocol HTTP/1.1, and therefore offers modern and effective local and remote printing solutions.

One of the most commonly used protocols today is the aforementioned IPP protocol, in particular because it is supported by most equipment. Its operation is simple, because it is very similar to the HTTP protocol. It functions like the latter according to a client server mode, with the client generally accessing the remote printer on port 80/TCP.

The functional content of the software module MTI for processing print requests and of the IPsec gateway PASS_D on which this module is loaded will be described in greater detail below.

When the terminal T_L constructs its IPsec tunnel, it participates in an IKE exchange (RFC2409) with the IPsec gateway PASS_D, during which the IPsec gateway receives IP packets of which the source address is the public IP address of the home router ROUT_L, i.e. AD_1.

Indeed, during the crossing of the router ROUT_L, the address AD_1 of this router is systematically substituted for the internal address ad_1 of the terminal T_L.

The IPsec gateway PASS_D assigns the terminal T_L a dynamic IP address, referred to as ad_3, belonging to the addressing plan of the network RES_D of the business.

The IPsec gateway, which knows the public address AD_1 of the router ROUT_L of the local network RES_L, and the address ad_3 dynamically assigned to the terminal T_L, sends the module MTI a message to update the correspondence table that associates these two addresses.

Upon receipt of the message to update the correspondence table with the addresses AD_1 and ad_3, the software module MTI updates the table.

When the terminal T_L starts a print job, it chooses, the printer E_L of the local network RES_L as the destination printer, as it would do in a simpler situation where no IPsec tunnel was established.

Because the IPsec tunnel is in blocking mode, the control and data flow from the terminal T_L intended for the printer E_L is channeled by the tunnel to the IPsec gateway PASS_D.

When it sees the arrival of the traffic routed through the IPsec tunnel and intended for a machine of which the address ad_2 belongs to a network that is not the business network RES_D, the IPsec gateway PASS_D asks the software module MTI to which home router it is to redirect this traffic. To do this, the gateway PASS_D provides the module MTI with the address of the terminal T_L as it is seen on the network RES_D of the business, i.e. with the address ad_3 that was assigned to it during the IKE exchange.

The module MTI consults the correspondence table and, based on the address ad_3 of the terminal T_L, deduces the public address AD_1 of the home router ROUT_L.

The IPsec gateway updates its routing table with this new destination and transmits the print order to the home router ROUT_L. In other words, the gateway PASS_D thus carries out the relay of all the packets received to the public IP address, i.e. AD_1, of the home router ROUT_L.

When it receives this flow, the home router redirects it to the printer E_L by means of the port translation mechanism ("port forwarding").

When the terminal T_L closes the IPsec session, or when the IPsec gateway PASS_D detects that the terminal T_L is disconnected, it asks the module MTI to delete from its table the entry that corresponds to the terminal T_L and also purges from its routing table the line corresponding to this terminal.

As a person skilled in the art will understand upon reading the above, the method of the invention makes it possible to eliminate the split tunneling mechanism, while providing the possibility of contacting local machines belonging to the network RES_L of the terminal T_L, in a perfectly secure manner. It does not reduce the security of the network of the business.

This method does not require any modification or configuration on the printer E_L, the home router ROUT_L or on the terminal T_L.

In addition, it enables advanced functions of printers to be enjoyed because the parameters of the local printer remain valid, even though the printing passes through the network RES_D of the business.

Instead of passing in unscrambled mode over the Internet, the flow circulating from the IPsec gateway PASS_D to the home network RES_L can be protected from eavesdropping by an IPsec tunnel established between this gateway and the router ROUT_L. This tunnel is constructed at the instance of the IPsec gateway when it wants to reroute a flow to the home network RES_L. In this case, the home router must be configured so as to accept the construction of the tunnel without the user's intervention.

The flow circulating from the IPsec gateway PASS_D to the home network RES_L can also be protected from eavesdropping by an SSL tunnel established between the IPsec gateway and the printer E_L, if this printer has the ability to communicate in SSL. This functionality can therefore be advantageously used in this invention.

In both cases, this makes it possible to protect the home network RES_L from intrusions by authenticating the IPsec gateway, and to guarantee the confidentiality of the exchanged data owing to the encryption.

Finally, as most home routers ROUT_L authorize the establishment of basic firewall rules, it is possible to establish a static rule so as to reserve, for the IPsec gateway PASS_D, access to the printer E_L (via the port translation mechanism), which provides a higher level of security by protecting the local network RES_L.

What is claimed is:

1. A method for operating a local network and a remote network, a local terminal of the local network being connected to a gateway of the remote network by a tunnel established in blocking mode, the method comprising:
   using the gateway, receiving a flow emitted from the local terminal and routed to the gateway through the tunnel, wherein the flow has a destination address equal to an internal address of local equipment located in the local network; and
   when the received flow is not intended for the remote network:
      using the gateway, sending the received flow to a router of the local network for the router to re-route the received flow to the internal address of the local equipment,
      the gateway identifying the router using information obtained during the establishment of the tunnel.

2. The method according to claim 1, further comprising analyzing, using the gateway, incoming flows so as to recognize that the received flow is not intended for the remote network.

3. The method according to claim 1, further comprising:
   during establishment of the tunnel:
      replacing, using the router, an address of the local terminal inside the local network with a routable address of the router during a request for connection from the local terminal to the gateway;
      assigning, using the gateway, a remote address inside the remote network to the local terminal during the establishment of the tunnel; and
      storing, using the gateway, an entry in a correspondence table that matches the routable address with the remote address of the local terminal;
   after establishment of the tunnel:
      identifying, using the gateway, the routable address of the router from the correspondence table based on the remote address of the local terminal associated with the flow; and
      sending, using the gateway, the received flow to the routable address of the router.

4. The method according to claim 1, wherein the re-routing the received flow to the internal address of the local equipment is implemented by a port translation technique.

5. The method according to claim 1, wherein the flow from the local terminal includes a print order.

6. The method according to claim 1, further comprising establishing one of an IPsec tunnel and an SSL tunnel connecting the gateway to the router.

7. The method according to claim 1, further comprising using the gateway to establish one of an IPsec tunnel and an SSL tunnel connecting the gateway to the local equipment, wherein the local equipment includes a printer.

8. The method according to claim 1, wherein the local equipment includes a printer.

9. A system that includes a processor and a non-transitory tangible computer-readable medium storing instructions that, when executed by the processor, cause the processor to implement the method of claim 1, wherein the system is implement in the gateway of the remote network.

10. The system according to claim 9, wherein the gateway is an IPsec gateway.

11. The system according to claim 10, wherein the tangible computer-readable medium includes instructions that analyze flows of the gateway to recognize that the flow is not intended for the remote network.

12. A gateway including a processor and a non-transitory tangible computer-readable medium storing instructions that, when executed by the processor, cause the processor to implement the method of claim 1.

13. A network device including a processor and a non-transitory tangible computer-readable medium storing instructions that, when executed by the processor, cause the processor to implement the method of claim 1.

14. A method of operating a gateway located between a first network and a wide area network, the method comprising:
   maintaining a table that maps local addresses of the first network to routable addresses of the wide area network;
   establishing a blocking tunnel with a terminal located in a second network, wherein the terminal communicates with the gateway via a router located between the second network and the wide area network, and wherein the establishing includes:
      assigning the terminal a first address within the first network;
      receiving a packet from the terminal via the blocking tunnel where a routable address of the router was stored in a source address field of the packet by the router; and
      creating an entry in the table that maps the assigned first address to the routable address of the router;
   receiving packets from the wide area network;
   identifying received packets that were sent by the terminal through the blocking tunnel and that have a destination address field equal to an internal address of local equipment within the second network; and
   forwarding the identified packets to the routable address of the router over the wide area network, wherein the routable address of the router is obtained from the table using the assigned first address of the terminal, and wherein the router forwards the identified packets to the internal address of the local equipment via the second network.

15. A gateway including a processor and a non-transitory tangible computer-readable medium storing instructions that, when executed by the processor, cause the processor to implement the method of claim 14.

16. A network device including a processor and a non-transitory tangible computer-readable medium storing instructions that, when executed by the processor, cause the processor to implement the method of claim 14.

* * * * *